United States Patent [19]
Al-Dokhi

[11] Patent Number: 5,921,334
[45] Date of Patent: Jul. 13, 1999

[54] HIGHWAY GENERATOR

[76] Inventor: Mansour Bandar Al-Dokhi, P.O. Box 90390, Riyadh 11613, Saudi Arabia

[21] Appl. No.: 08/770,340

[22] Filed: Dec. 20, 1996

[51] Int. Cl.$^6$ ..................................................... B60L 9/00
[52] U.S. Cl. ............................................ 180/2.2; 180/65.3
[58] Field of Search ................................ 180/2.1, 2.2, 16, 180/209, 65.2, 65.3, 65.4; 280/767, 847, 43.17, 43.18, 43.19, 212, 288.4; 16/111 R; 70/230; 310/75 C, 85, 89, 91; 403/378, 363

[56] References Cited

U.S. PATENT DOCUMENTS

| | | |
|---|---|---|
| 704,573 | 8/1902 | Pintsch . |
| 881,599 | 3/1908 | Maher . |
| 1,111,864 | 9/1914 | Sanladerer . |
| 1,835,895 | 12/1931 | Parsons ..................................... 180/2.1 |
| 2,251,584 | 8/1941 | Fageol et al. ............................. 180/2.1 |
| 2,530,857 | 11/1950 | Campbell ................................. 280/847 |
| 2,652,908 | 9/1953 | Fuller ..................................... 16/111 R |
| 2,660,443 | 11/1953 | Miller ...................................... 280/847 |
| 4,314,160 | 2/1982 | Boodman et al. ....................... 180/2.2 |
| 4,358,941 | 11/1982 | Zimmer ..................................... 70/230 |
| 4,739,206 | 4/1988 | Sieber ....................................... 310/91 |
| 4,754,628 | 7/1988 | Siegel ....................................... 70/230 |
| 4,931,683 | 6/1990 | Gleixner et al. .......................... 310/91 |
| 5,280,827 | 1/1994 | Taylor et al. . |
| 5,297,888 | 3/1994 | Nehls ...................................... 403/363 |
| 5,680,907 | 10/1997 | Weihe .................................... 180/65.3 |

FOREIGN PATENT DOCUMENTS

| | | | |
|---|---|---|---|
| 040111 | 11/1981 | European Pat. Off. .............. | 180/65.2 |
| 1039936 | 9/1958 | Germany ............................. | 280/43.18 |
| 763498 | 12/1956 | United Kingdom ................ | 280/43.19 |

Primary Examiner—Daniel G. DePumpo
Assistant Examiner—Frank Vanaman
Attorney, Agent, or Firm—Michael I. Kroll

[57] ABSTRACT

A highway generator (10) for a motor vehicle (12) comprising a generator unit (14) to convert mechanical energy into electrical energy. A structure (16) is for connecting the generator unit (14) to a rear portion of an undercarriage (18) of the motor vehicle (12). A wheel assembly (20) is coupled to the connecting structure (16), so that the wheel assembly (20) can rotate upon a road (22) that the motor vehicle (12) travels upon. A facility (24) extends between the generator unit (14) and the wheel assembly (20), for operating the generator unit (14) by the rotation of the wheel assembly (20) upon the road (22). The generator unit (14) can supply electricity to various electrical components within the motor vehicle (12).

1 Claim, 8 Drawing Sheets

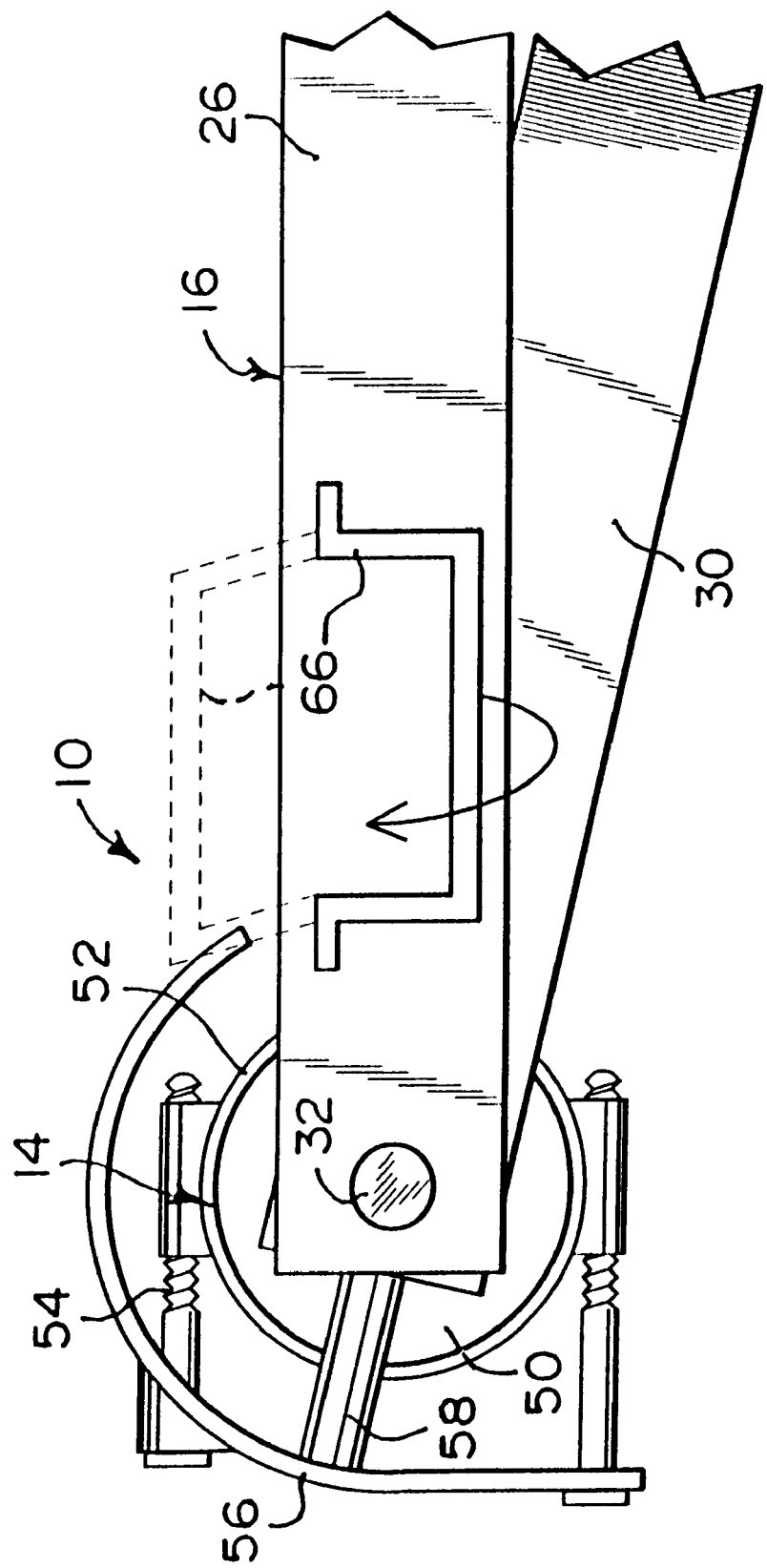

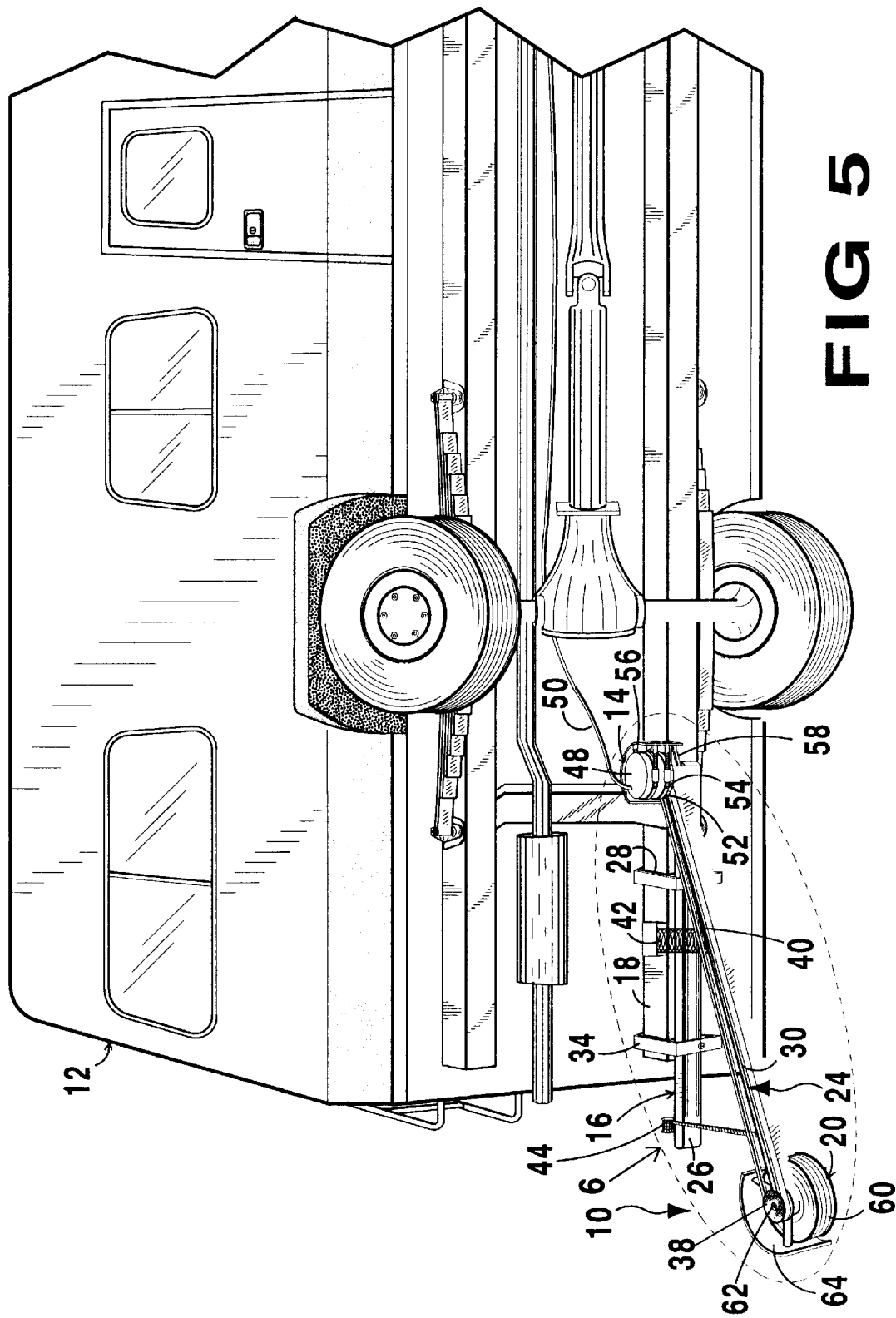

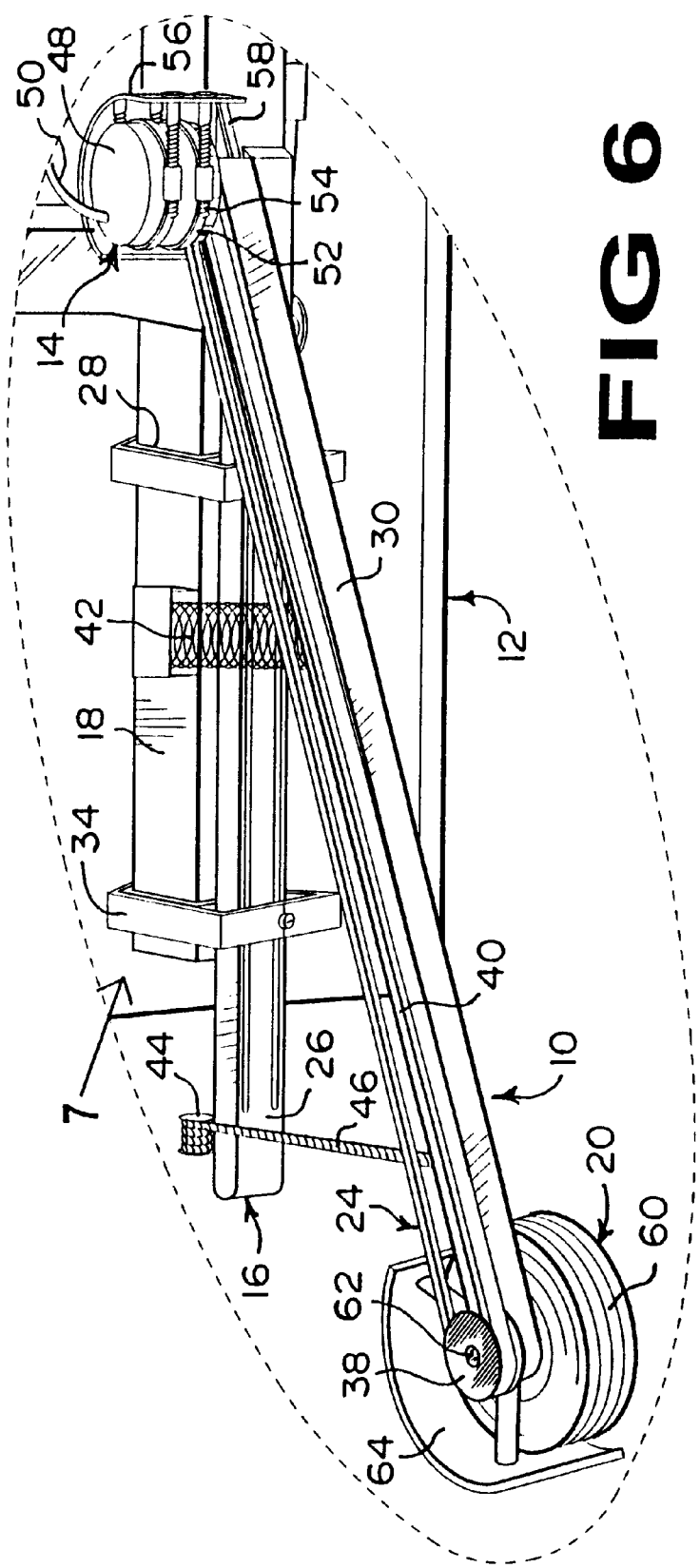

HIGHWAY GENERATOR

BACKGROUND OF THE INVENTION

1. Field of the Invention

The instant invention relates generally to electricity generating systems and more specifically it relates to a highway generator. The highway generator is connected to the undercarriage of a motor vehicle, so that a wheel rolling along a road will operate a generator to supply electricity to various electrical components within the motor vehicle during long distance travel.

2. Description of the Prior Art

Numerous electricity generating systems have been provided in prior art. For example, U.S. Pat. No. 704,573 to Pintsch; U.S. Pat. No. 881,599 to Maher; U.S. Pat. No. 1,111,864 to Sanladerer and U.S. Pat. No. 5,280,827 to Taylor et al. all are illustrative of such prior art. While these units may be suitable for the particular purpose to which they address, they would not be as suitable for the purposes of the present invention as heretofore described.

PINTSCH, RICHARD
DEVICE FOR GENERATING ELECTRICITY ON RUNNING CARS
U.S. Pat. No. 704,573

In a plant in which power is transmitted from the running-gear of a car, to generate electricity, the combination of a power-transmission train, an electromagnetic coupling interposed therein, an electric-current generator operated thereby, and a switch controlling the operation of the coupling, and by means thereof, controlling the operation of the generator; all substantially as described and for the purpose specified.

MAHER, LAWRENCE C.
MEANS FOR TRANSMITTING POWER FROM THE AXLES OF RAILWAY CARS
U.S. Pat. No. 881,599

In combination with a generator carried by the body of a car, a wheel, a flexible shaft connecting the generator and wheel, a driving wheel secured upon the axle of the car, a spring for forcing the driven wheel in contact with the driving wheel, an armature upon which the driven wheel is journaled and an electromagnet so arranged as to draw the armature upward and thereby lift the driven wheel out of contact with the driving wheel when the magnet is vitalized, as specified.

SANLADERER, ALOIS
ELECTRIC LIGHTING APPARATUS FOR VELOCIPEDES
U.S. Pat. No. 1,111,864

The combination with a rotary casing, of an armature mounted for rotation in the casing, a set of field magnets disposed within the casing, and an elastic driving clutch between the casing and armature for driving the latter oppositely to the casing.

TAYLOR, CLETUS L.
MUELLER, WALTER H.
VENTURI EFFECT CHARGING SYSTEM FOR AUTOMOBILE BATTERIES
U.S. Pat. No. 5,280,827

An electric motor-driven vehicle has a large wind turbine mounted at the rear of the vehicle that rotates about an axis perpendicular t the axis of the vehicle body. A long venturi tube extends along the upper portion of the vehicle above the passenger cab and directs air flow from the front of the vehicle and impinges it upon an upper portion of the turbine blades. A pair of elongated lower screw-type turbines are contained in separate lower venturi effect tubes extending along the lower side of the vehicle below the passenger cab. Air from the lower venturi effect tubes is impinged upon the large turbine in a direction and at a location to increase the force generated from the upper venturi tube. The turbines drive one or more electric power generators coupled to storage batteries for recharging the batteries.

SUMMARY OF THE INVENTION

A primary object of the present invention is to provide a highway generator that will overcome the shortcomings of the prior art devices.

Another object is to provide a highway generator that is connected to the undercarriage of a motor vehicle, so that a wheel rolling along a road will turn a belt to operate a generator which will supply electricity to various electrical components within the motor vehicle during long distance travel of the motor vehicle.

An additional object is to provide a highway generator that is lightweight and portable, while it's small size is ideal for storage when not in use.

A further object is to provide a highway generator that is simple and easy to use.

A still further object is to provide a highway generator that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 4A is a side view taken in the direction of arrow 4A in FIG. 4 with parts broken away and removed.

FIG. 5 is a bottom perspective view taken in the direction of arrow 5 in FIG. 2, with a portion of the recreational vehicle broken away.

FIG. 6 is an enlarged bottom perspective view of the instant invention as indicated by arrow 6 in FIG. 5.

Similar reference characters denote corresponding features consistently throughout the attached drawings.

DETAILED DESCRIPTION OF THE PREFERRED EMBODIMENTS

Figure 1:
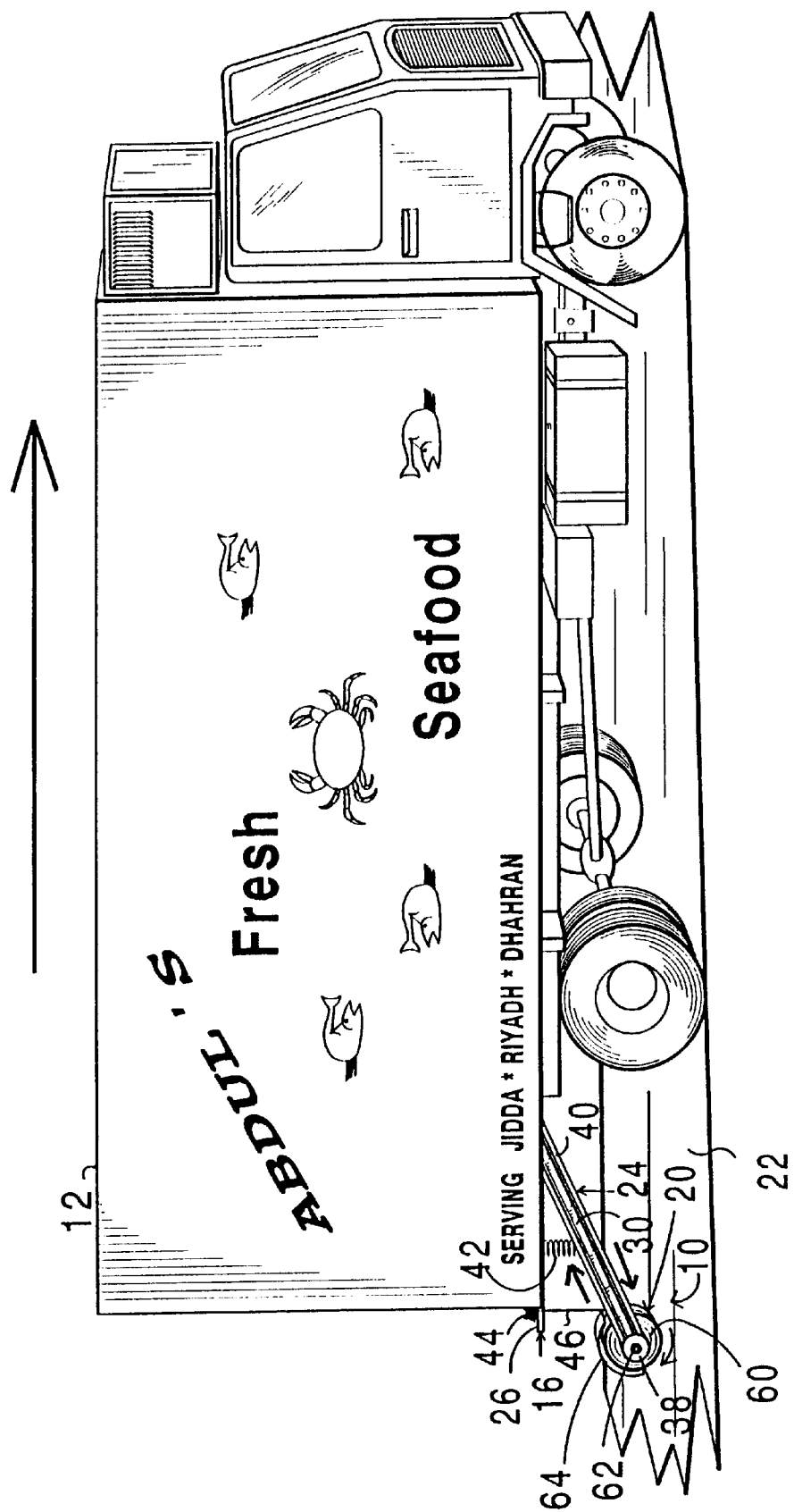
FIG. 1 is a side perspective view of a refrigeration truck with the instant invention attached thereto.
Figure 2:
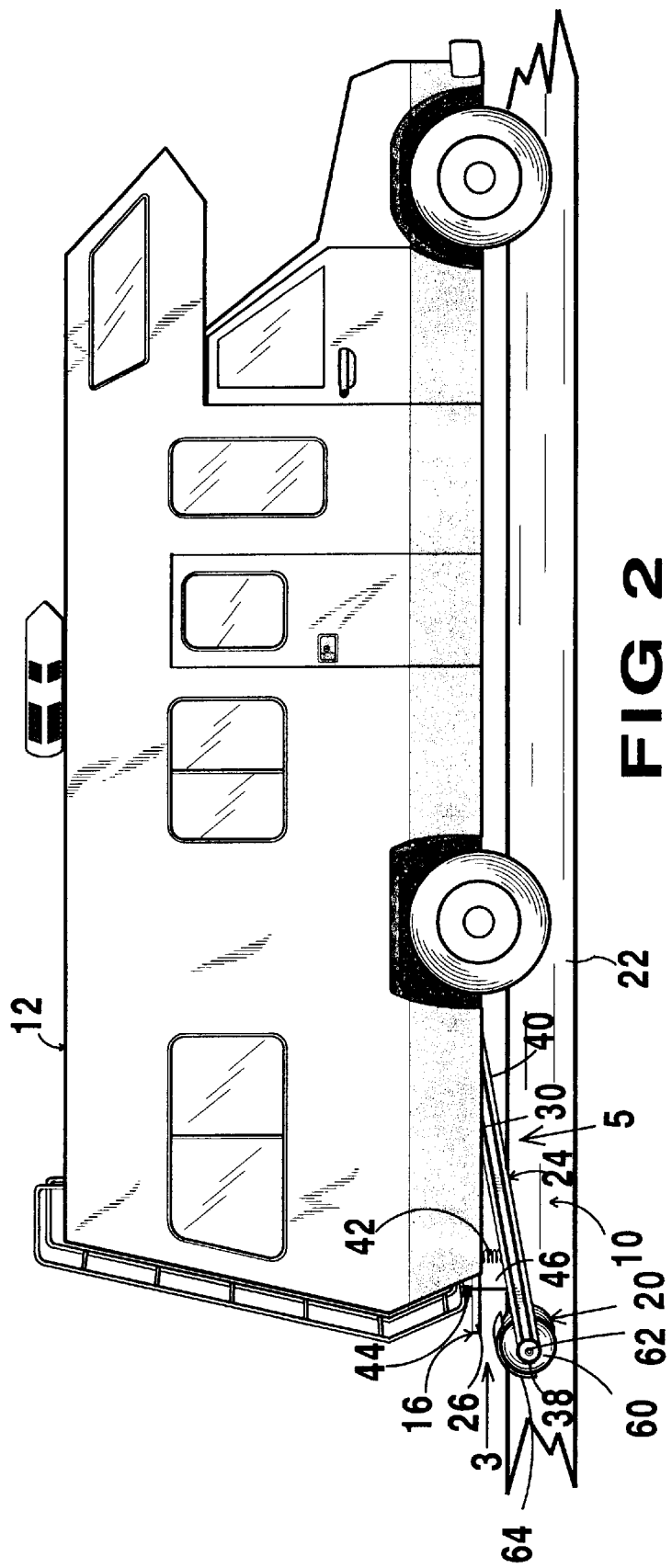
FIG. 2 is a side perspective view of a recreational vehicle with the instant invention attached thereto.
Figure 3:
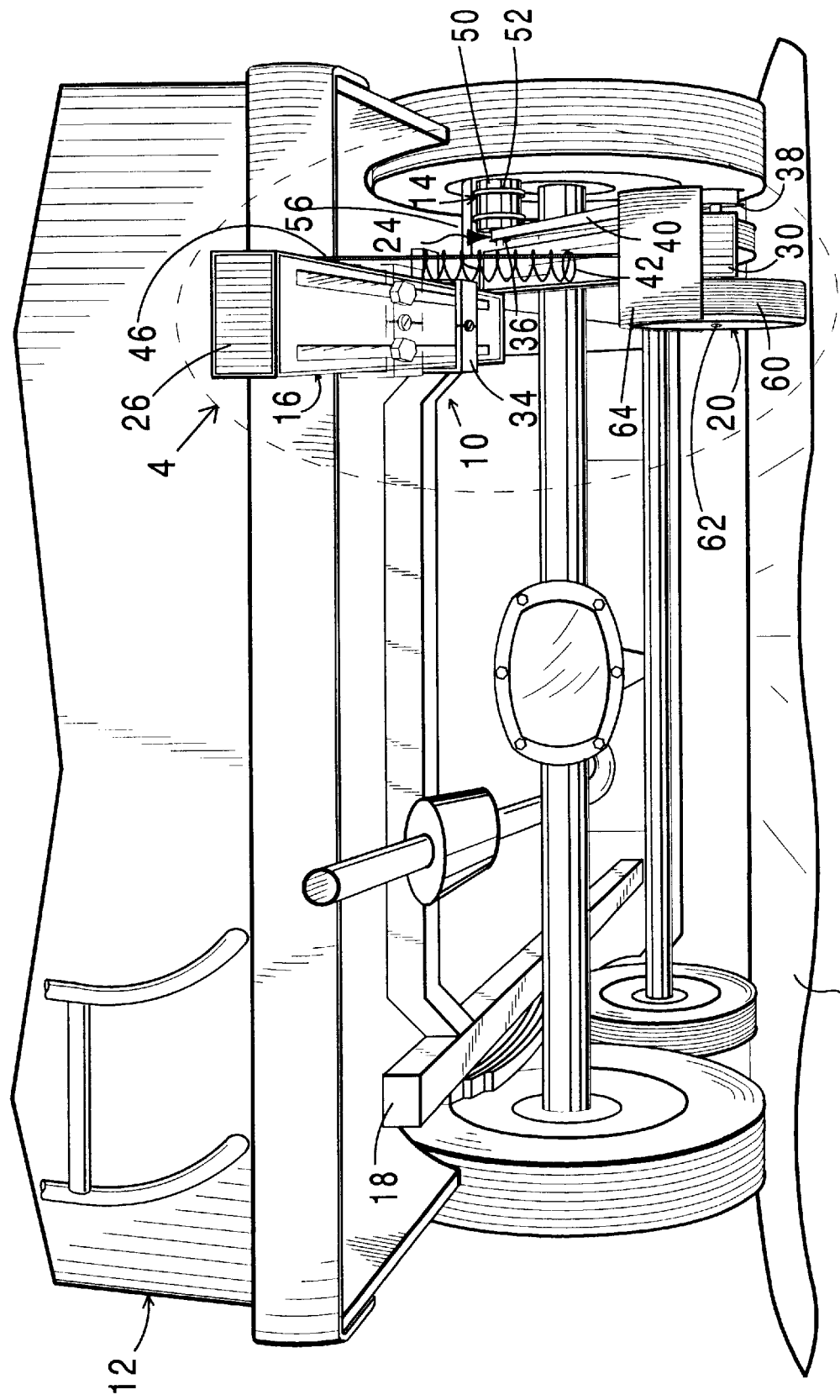
FIG. 3 is an enlarged rear perspective view taken in the direction of arrow 3 in FIG. 2, with a portion of the recreational vehicle broken away.
Figure 4:
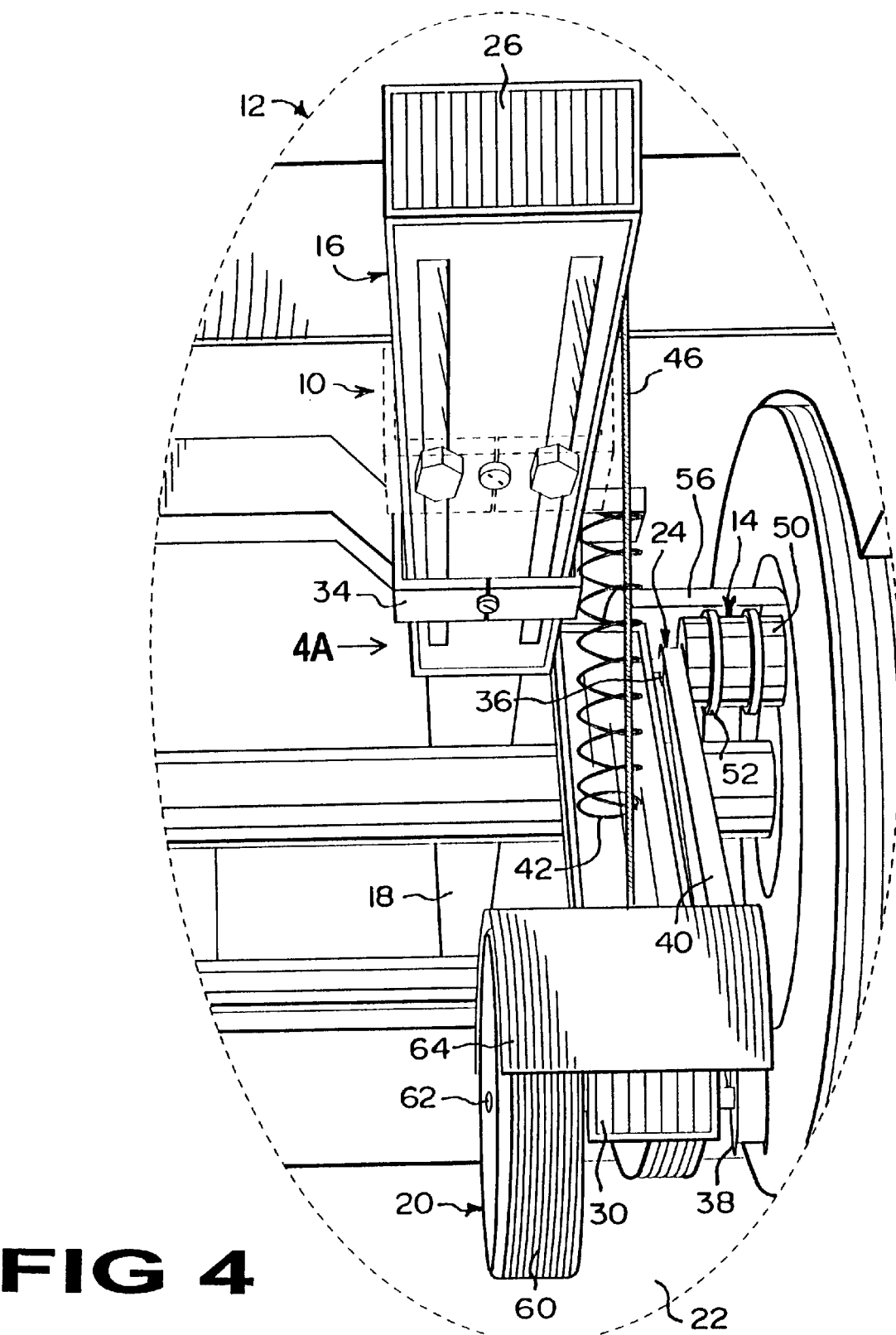
FIG. 4 is a further enlarged rear perspective view of the instant invention as indicated by arrow 4 in FIG. 3.
Figure 7:
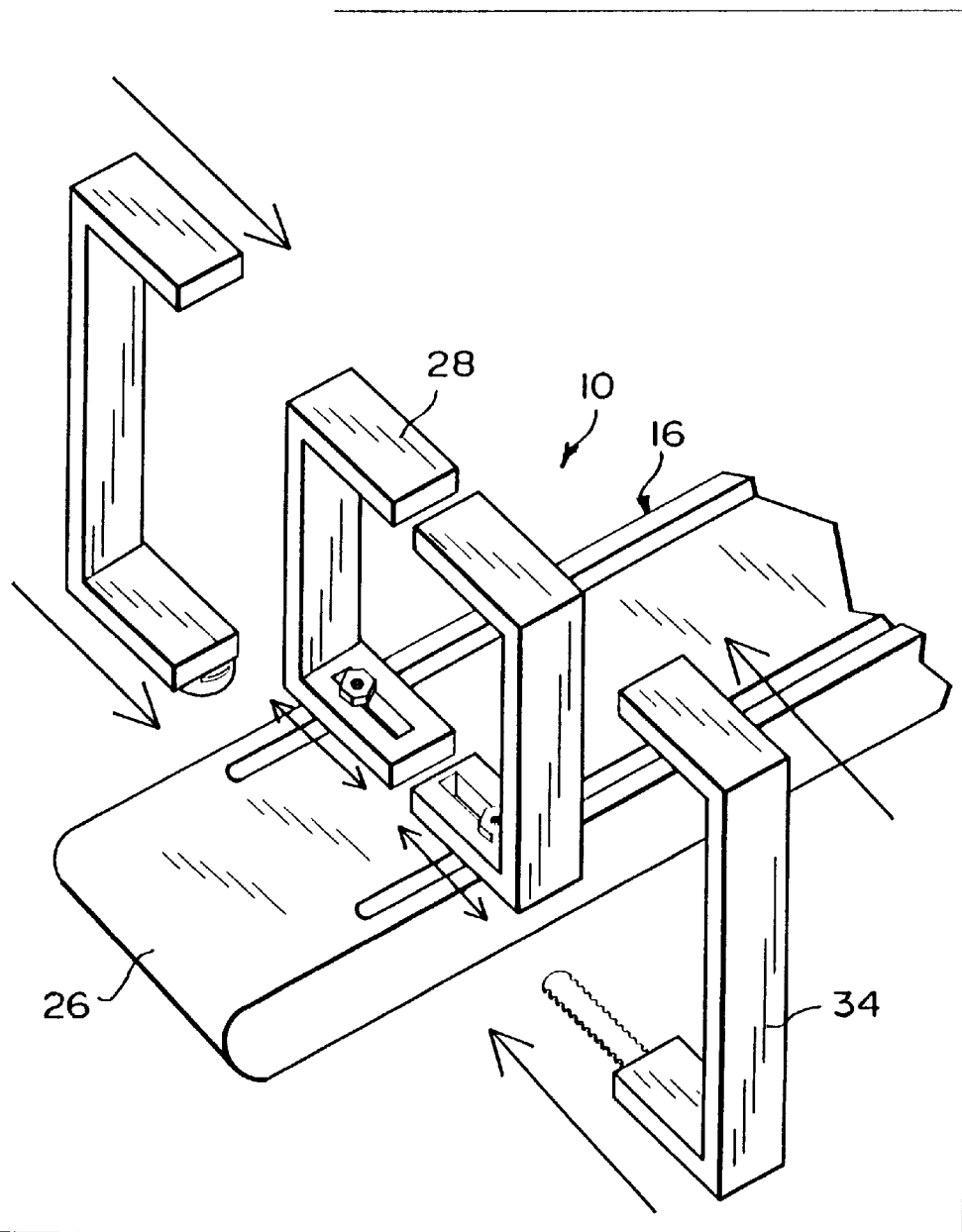
FIG. 7 is an exploded top perspective view showing the lock mechanism for one of the mounting brackets of the instant invention.

Turning now descriptively to the drawings, in which similar reference characters denote similar elements throughout the several views, FIGS. 1 through 7 illustrate a highway generator 10 for a motor vehicle 12 comprising a generator unit 14, to convert mechanical energy into electrical energy. A structure 16 is for connecting the generator unit 14 to a rear portion of an undercarriage 18 of the motor vehicle 12. A wheel assembly 20 is coupled to the connecting structure 16, so that the wheel assembly 20 can rotate upon a road 22 that the motor vehicle 12 travels upon. A facility 24 extends between the generator unit 14 and the wheel assembly 20, for operating the generator unit 14 by the rotation of the wheel assembly 20 upon the road 22. The generator unit 14 can supply electricity to various electrical components within the motor vehicle 12.

The connecting structure 16 consists of a first arm 26. A pair of adjustable mounting brackets 28 (see FIG. 7), attach the first arm 26 to the rear portion of the undercarriage 18 of the motor vehicle 12. A second arm 30 carries the wheel assembly 20 on a rearward end thereof. A bearing shaft 32, shown in FIG. 4A, pivotally affixes a forward end of the first arm 26 to a forward end of the second arm 30. The second arm 30 can be lowered towards the road 22, to allow the wheel assembly 20 to contact the road 22 and rotate thereupon.

Each adjustable mounting bracket 28 includes a lock mechanism 34, to prevent an unauthorized removal of the first arm 26 from the rear portion of the undercarriage 18 of the motor vehicle 12.

The operating facility 24 comprises a first pulley 36 on the generator unit 14. A second pulley 38 is on the wheel assembly 20. An elongate belt 40 extends between the first pulley 36 and the second pulley 38. A spring 42 extends between the first arm 26 and the second arm 30. The spring 42 will act as a shock absorber and will cause the wheel assembly 20 to maintain contact upon the road 22.

A winch 44 is carried on the first arm 26. A cable 46 extends from the winch 44 to the second arm 30, so that the winch 44 can be operated to cause the cable 46 to retract the second arm 30 from the road 22 when not in use.

The generator unit 14 consists of a generator 48 having a generator output wire 50, to connect to various electrical components in the motor vehicle 12. A generator bracket 52 is about the generator 48. A plurality of bracket screws 54 are on the generator bracket 52, for tightening the generator bracket 52 to the generator 48.

The generator unit 14 further includes a generator cover 56 carried on the bracket screws 54 protects the generator 48 from road debris. A generator cover attachment arm 58 extends between the generator cover 56 and the forward end of the second arm 30, to hold the generator cover 56 thereto.

The wheel assembly 20 consists of a wheel 60 and an axle 62 through the wheel 60 at a rearward end of the second arm 30, so that the wheel 60 can rotate about the axle 62 on the road 22. The wheel assembly 20 further includes a wheel cover 64 connected to the rearward end of the second arm 30, to protect the wheel 60 from road debris.

A handle 66, as shown in FIG. 4A, is attached to the first arm 26. The highway generator 10 can be carried by the handle 66, when disconnected from the undercarriage 18 of the motor vehicle 12.

A constant speed drive can be connected between the first pulley 36 and the generator unit 14. The purpose of the constant speed drive is to keep the rotation of the generator 48 constant and the voltage steady, even if the speed of the motor vehicle 12 varies.

OPERATION OF THE INVENTION

To use the highway generator 10, the following steps should be taken:

1. Grasp the handle 66 and carry the first arm 26 to the rear portion of the undercarriage 18 of the motor vehicle 12.
2. Position the first arm 26, so that the generator unit 14 is facing forward under the motor vehicle 12.
3. Attach the adjustable mounting brackets 28 with the locking mechanisms 34 to the undercarriage 18 of the motor vehicle 12.
4. Connect the generator output wire 50 to the various electrical components in the motor vehicle 12.
5. Operate the winch 44 either manually or automatically from within the motor vehicle 12, so that the second arm 30 will drop down and the wheel assembly 20 will make contact with the road 22.
6. Drive the motor vehicle 12 along the road 22, so that the operating facility 24 between the generator unit 14 and the wheel assembly 20 will cause the generator unit 14 to supply electricity to the various electrical components within the motor vehicle 12.

LIST OF REFERENCE NUMBERS 10 highway generator
12 motor vehicle
14 generator unit of 10
16 connecting structure of 10
18 undercarriage of 12
20 wheel assembly of 10
22 road
24 operating facility of 10
26 first arm of 16
28 adjustable mounting bracket of 16
30 second arm of 16
32 bearing shaft of 16
34 lock mechanism of 28
36 first pulley of 24 on 14
38 second pulley of 24 on 20
40 elongate belt of 24
42 spring between 26 and 30
44 winch on 26
46 cable from 44 to 30
48 generator of 14
50 generator output wire on 48
52 generator bracket of 14
54 bracket screw of 14
56 generator cover of 14
58 generator cover attachment arm of 14
60 wheel of 20
62 axle of 20
64 wheel cover of 20
66 handle on 30

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A highway generator for a motor vehicle comprising:
    a) a generator unit to convert mechanical energy into electrical energy;
    b) means for connecting said generator unit to a rear portion of an undercarriage of the motor vehicle comprising a first arm, a pair of adjustable mounting brackets to attach said first arm to the rear portion of the undercarriage of the motor vehicle, a second arm carrying a wheel assembly on a rearward end thereof, and a bearing shaft to pivotally affix a forward end of said first arm to a forward end of said second arm so that said second arm can be lowered towards a road that the vehicle travels upon to allow said wheel assembly to contact the road and rotate thereupon, said adjustable mounting bracket including a lock mechanism to prevent an unauthorized removal of said first arm from the rear portion of the undercarriage of the motor vehicle;
    c) means extending between said generator unit and said wheel assembly for operating said generator unit by the rotation of said wheel assembly upon the road, so that said generator unit can supply electricity to various electrical components within the motor vehicle, said operating means comprising a first pulley on said generator unit, a second pulley on said wheel assembly, and an elongate belt extending between said first pulley and said second pulley;
    d) means for absorbing road shocks on said wheel assembly comprising a spring extending between said first arm and said second arm, said spring being compressed when said wheel is driven upwardly;
    e) a winch carried on said first arm and a cable extending from said winch to said second arm between said spring and said wheel assembly to retract said second arm from the road when said highway generator is not in use;
    f) said generator unit including a generator having a generator output wire to connect to various electrical components in the motor vehicle, a generator bracket about said generator, a plurality of bracket screws on said generator bracket for tightening said generator bracket to said generator, a generator cover carried on said bracket screws to protect said generator from road debris, and a generator cover attachment arm extending between said generator cover and the forward end of said second arm to hold said generator cover thereto;
    g) said wheel assembly including a wheel, an axle through said wheel at a rearward end of said second arm, and a wheel cover connected to the rearward end of said second arm behind said wheel to protect said wheel from road debris; and
    h) a handle attached to said first arm so that said highway generator is portable and can be carried by said handle when disconnected from the undercarriage of said motor vehicle.

* * * * *